March 12, 1935.　　　G. B. SCHEIBELL　　　1,994,288
WAVE PROPAGATION SYSTEM
Filed April 21, 1932　　2 Sheets-Sheet 1
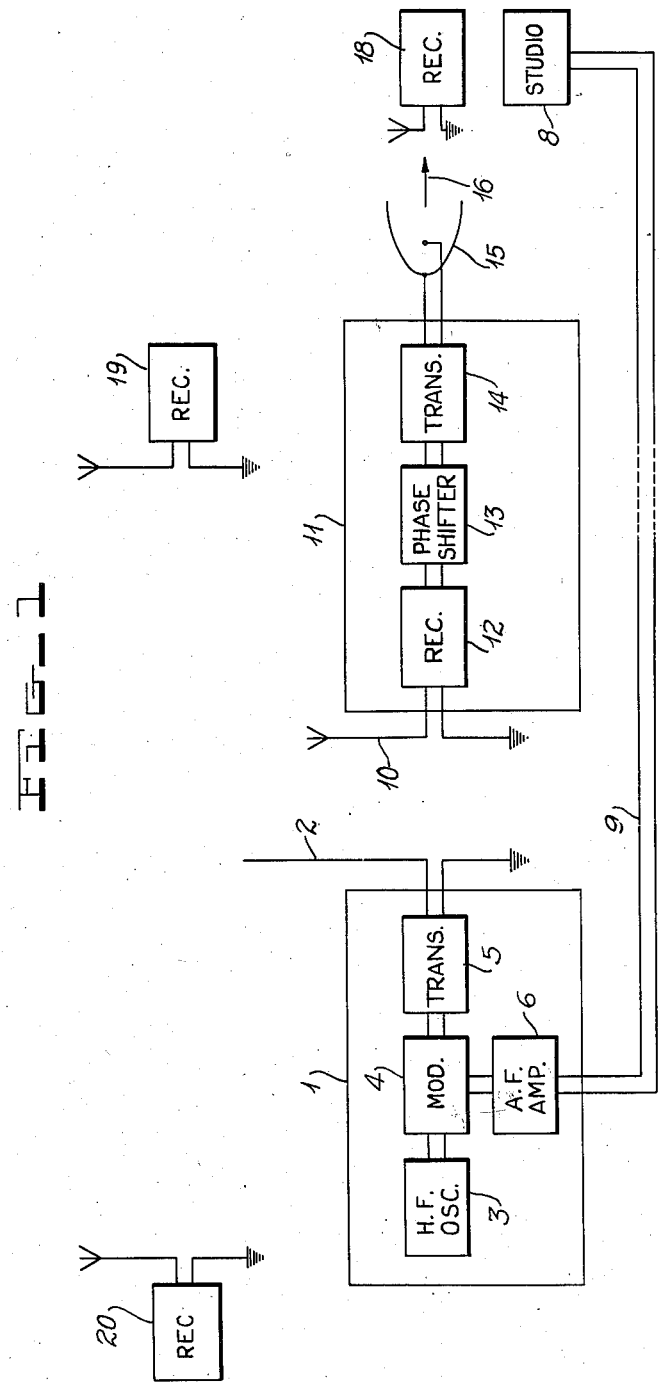
INVENTOR
Gordon Brown Scheibell
BY
ATTORNEY March 12, 1935. G. B. SCHEIBELL 1,994,288
WAVE PROPAGATION SYSTEM
Filed April 21, 1932 2 Sheets-Sheet 2
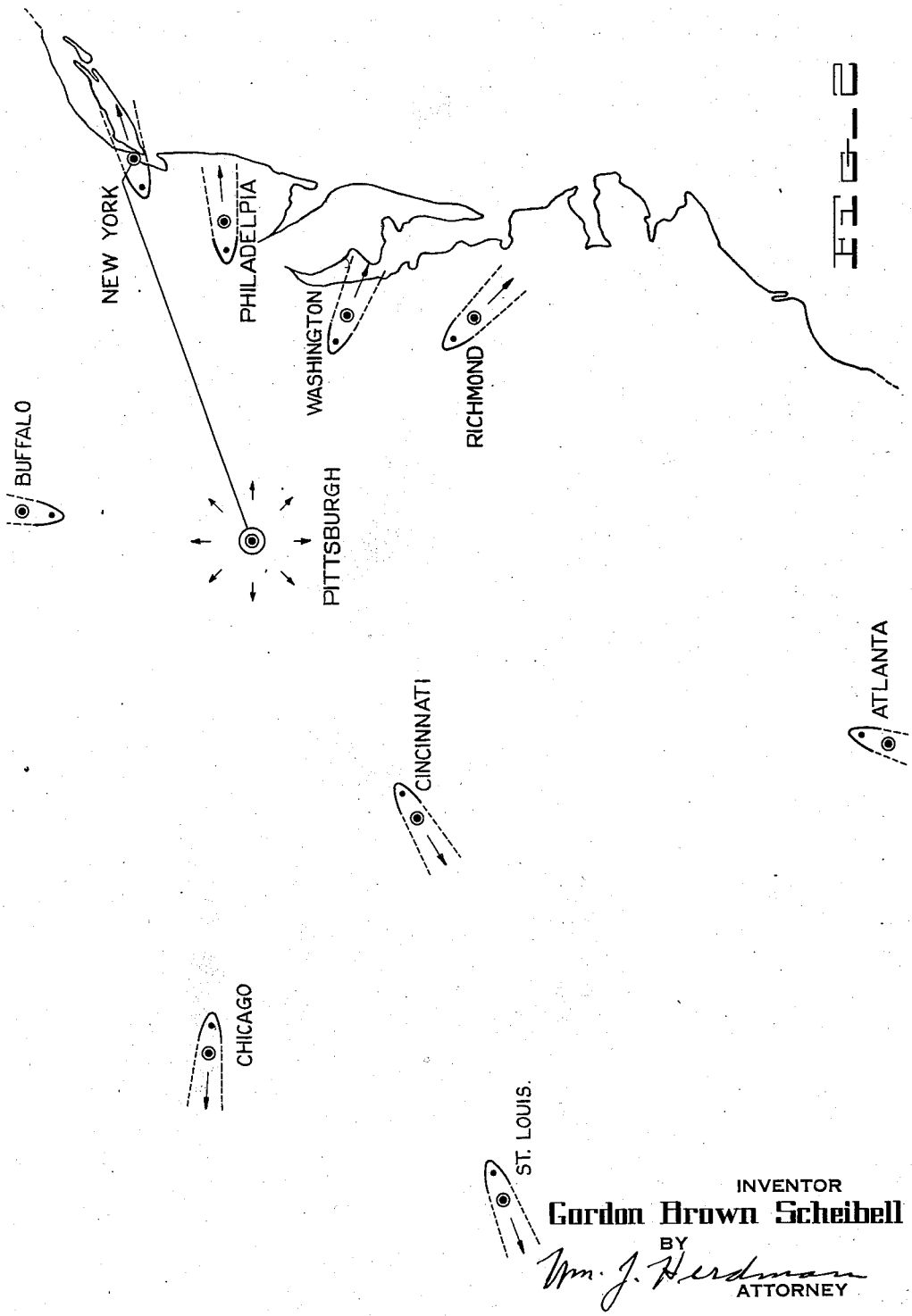
INVENTOR
Gordon Brown Scheibell
BY
ATTORNEY Patented Mar. 12, 1935

1,994,288

UNITED STATES PATENT OFFICE 1,994,288

WAVE PROPAGATION SYSTEM

Gordon Brown Scheibell, Newark, N. J., assignor to Wired Radio, Inc., New York, N. Y., a corporation of Delaware Application April 21, 1932, Serial No. 606,552

8 Claims. (Cl. 250—15)

My invention pertains in general to radiation systems and is more specifically directed to a form of wave propagation system in which a plurality of stations radiate the same program at the same carrier frequency.

Various experiments have been made with systems for radiating a program from a plurality of different geographic points at one carrier frequency. The principal object of such systems, known as "synchronized broadcasting", has been to accomplish a conservation in the frequency requirement for program distribution. However, it has been found, in "synchronized broadcasting", that in certain geographic areas disturbing conditions for program reception exist which render good quality of program reproduction practically impossible.

One of the objects of my invention consists in providing an improved system for radiating a common program at one carrier frequency from a plurality of radiation systems for effecting frequency conservation in the distribution of a program over a large geographic area.

Another object consists in producing a system for the progressive reinforcement of electromagnetic waves radiating from a central point.

A further object comprises providing a radiation system employing a central broadcasting station and a plurality of directive radiation systems under control thereof.

These and other desirable objects will be apparent from the following, reference being had to the accompanying drawings in which:

Fig. 1 is a schematic representation of apparatus employed in an embodiment of the radiation system of my invention, and Fig. 2 is a schematic representation of a typical installation of my invention showing a plurality of stations geographically disposed for distributing a common program to a plurality of thickly populated areas in different geographic localities.

My invention contemplates the distribution of a program over a large geographic area by the propagation of waves of a common carrier frequency from a plurality of different radiation systems, the waves having a general direction of propagation calculated to substantially eliminate interference. In carrying out the principles of my invention, I employ a central radiation system which is omni-directional and is supplemented by several directive systems for re-radiating waves under control of the central station and of the same frequency as the waves broadcast therefrom for accomplishing, in effect, the reinforcement of the program radiation field of the central station for selected areas such as thickly populated districts.

Fig. 1 schematically depicts apparatus employed in carrying out one embodiment of my invention, while Fig. 2 represents how such apparatus might be utilized to radiate a common program over a large geographic area such as a section of North America, as shown. Referring to Fig. 2, I provide a central station 1 having an omni-directional radiation system 2 for propagating waves in all directions with respect to the surface of the earth. Within the central station 1 there is provided a high frequency oscillator 3 which may be any means well known in the art for producing sustained high frequency oscillations suitable for space radio carrier purposes. A studio 8, which may be remotely situated from the central station 1, is connected by wire lines 9 to an audio frequency amplifier 6 within the central station 1. The studio 8 includes suitable microphones, amplifiers, and monitoring equipment for producing audio frequency currents in accordance with various programs either audible, visual, or both. The audio frequency currents from studio 8, after being transmitted over wire lines 9 and amplified by amplifier 6, are fed into a modulator 4 for modulating the high frequency oscillations produced by oscillator 3 in a well known manner for subsequent amplification by transmitter 5 and radiation over the system 2.

Disposed in the path of propagation of waves from the radiation system 2 is a substation 11 which may be situated with respect to a selected geographic area to be served by program distribution. The substation 11 includes a receiver 12 for receiving program signals by a receiving antenna 10 and which originated from the radiation system 2. The receiver 12 works through a phase shifter 13 into a transmitter 14. The transmitter 14 has output connections with a directional antenna or radiation system 15. The radiation system 15 may be constructed along principles known in the art for effecting the propagation of radio waves in a desired direction as indicated by the arrow 16. The phase shifter 13 provides means known in the art for affecting the phase relationship of the waves propagated from the radiation system 15 with respect to received waves so that, in accordance with my invention, the carrier frequency of the waves propagated by the radiation system 15 will be in phase with the corresponding carrier frequency of the waves transmitted in that direction by the radiation system 2.

In the operation of the system of my invention, the substation 11 receives program signals from the central station 1 and effects the amplification of these signals for re-radiation over the radiation system 15 substantially in a desired direction, the waves radiated from the system 15 being of a frequency corresponding to the frequency of the waves received from radiation system 2 by antenna 10. A receiving station 18 is disposed in a selected area in the path of propagation of waves from the radiation system 15, and is indicative of various receiving equipment which may be so disposed for reception of programs. The antenna of receiver 18 will receive waves propagated from the radiation system 15 and from the radiation system 2. The intensity of the radiation field of system 15 at the point of reception of receiver 18 will be greater than the intensity of the radiation field of the system 2 at the point of reception of the receiver 18 due to the geographic situation of the radiation systems with respect to the receiver. The receiver 18, being in a selected geographic area, will benefit from the effective reinforcement of the radiation field of system 2 as produced by system 15 under control of substation 11 so that elaborate reception apparatus will not be necessary for satisfactory program reproduction.

Other receiving stations 19 and 20 may be disposed in sections outside of a selected area served by the directive radiation system 15. The stations 19 and 20 will therefore be substantially out of the influence of the radiation system 15 and will receive waves propagated from the radiation system 2 under control of central station 1. The program from central station 1 will not be subject to undesirable effects produced by interference of waves re-radiated by substation 11, due to the system of my invention for effecting re-radiation substantially in the direction of propagation of waves from the central station. Receiving stations 18, 19 and 20 have the design of their equipment proportioned to the intensity of the radiation field at the respective points of reception to give satisfactory program reproduction.

Fig. 2 represents an example of the commercial utilization of the apparatus of my invention as shown in Fig. 1 for accomplishing efficient distribution of a program over a desired geographic district such as a portion of the United States. Referring to Fig. 2, the central station 1 described in connection with Fig. 1 is located at Pittsburgh and is connected by wire lines with the studio 8 which is located at New York for considerations of accessibility for performing artists. The central station 1 located at Pittsburgh, which is chosen as being a central point in the area to be served, radiates waves in all directions with respect to the earth's surface, as indicated by the arrows. Stations 11 are provided in the outlying sections of various metropolitan districts such as New York, Philadelphia, Washington, et cetera, for re-radiating the program broadcast from Pittsburgh to produce regions of increased radiation field intensity for selected areas having dense population and in a manner which will avoid interference between the various stations.

In accordance with the principles of my invention, these substations are positioned on the outlying sections of the metropolitan districts which are at points nearest the central station at Pittsburgh. The directive radiation system 15 associated with each substation is positioned so that waves re-radiated therefrom will be substantially in the same direction and in phase with the waves traversing the same area but originating from the Pittsburgh central station. Receiving stations, such as receiving stations 19 and 20 of Fig. 1, which may be located in various towns and rural districts outside of the selected areas served by the substations 11 will be able to receive programs from the Pittsburgh central station provided that their equipment is properly proportioned with regard to the radiation held intensity at the point of reception of waves from the Pittsburgh station. That is, such remotely situated receiving stations must have equipment sufficiently sensitive to receive signals from the Pittsburgh omnidirectional central station, depending upon the distance of the receiving station therefrom, and, of course, if very remotely situated, do not enjoy the advantages of reception of stations comparatively close to the Pittsburgh central station or those stations lying within selected areas served by substations.

It will now be apparent that my system of radiation provides for the distribution of a program over a large geographic area in which a plurality of stations radiate waves at a common frequency in a manner which avoids undesirable interference areas between stations. Although I have shown a preferred embodiment of the apparatus of my invention and how the same can be utilized for accomplishing program distribution, it is to be understood that many changes and modifications can be made therein but which will not depart from the intended scope of my invention. I do not therefore desire to limit myself to the foregoing except insofar as may be pointed out in the appended claims.

What I claim as new and original and desire to secure by Letters Patent of the United States is:

1. In a system of radiation for broadcasting to a plurality of variously located receivers, means for broadcasting a program by substantially uniform omnidirectional propagation of modulated electromagnetic waves and secondary means disposed in the path of propagation of said waves for propagating other but similarly modulated waves substantially in the general direction of propagation of said first mentioned waves and of a similar frequency to produce coincidence of modulation contour of waves from said first mentioned means and said second mentioned means in the area of propagation of said second mentioned means whereby receivers affected by waves from more than one source will receive waves from said first mentioned means augmented by said secondary means substantially without modulation interference between said waves.

2. In a system of radiation, the combination with a substantially uniformly omnidirectional radiation system of a plurality of directional radiation systems controlled thereby for directionally reinforcing the field of said omnidirectional radiation system to produce coincidence of wave contour of waves from both the omnidirectional and directional radiation systems within the field of said directional radiation systems.

3. The combination with a substantially uniformly omnidirectional radiation system of a plurality of directional radiation systems for directionally reinforcing the field of said omnidirectional radiation system by propagating electromagnetic waves in a general direction away from said omnidirectional radiation system and in wave contour coincidence with the waves of said omnidirectional radiation system.

4. A system of radiation comprising, means for uniformly omnidirectionally propagating electromagnetic waves for producing an omnidirectional field and other means remotely situated from said first mentioned means for propogating electromagnetic waves for reinforcing said omnidirectional field only in the direction of propagation of said first mentioned waves, and in wave contour coincidence therewith.

5. A system of radiation comprising, a central station including means for producing sustained high frequency oscillations of a particular frequency, means for effecting the modulation of said high frequency oscillations at said central station, means at said central station control of said modulated high frequency oscillations for producing the substantially uniformly omnidirectional propagation of electromagnetic waves carrying modulation, and means remotely situated from said central station, said means including an antenna for receiving said electromagnetic waves, means for amplifying the energy value of said received waves, and means under control of said last mentioned means for producing the directive propagation of electromagnetic waves in the direction of propagation of said first mentioned waves for reinforcing the same in a manner such that the modulation carried by said first mentioned propagated waves and the modulation carried by said second mentioned propagated waves will substantially coincide, in the area of propagation of said second mentioned waves.

6. A system in accordance with claim 2 in which said directional radiation systems all propagate waves in different directions.

7. A system in accordance with claim 2 in which said directional systems all propagate waves along different courses all of which are radial from a common central point.

8. The method of radiating high frequency waves of a similar frequency from a plurality of radiation systems whereby a receiving station influenced by more than one of said stations can receive common program modulation signals from more than one of said stations substantially without interference comprising, producing sustained high frequency oscillations of a particular frequency, modulating said high frequency oscillations and controlling a radiation system with said modulated high frequency oscillations for propagating high frequency waves carrying program modulation; receiving said waves, amplifying said received waves, and re-radiating said received and amplified waves to produce the propagation of waves coinciding in direction and frequency with waves propagated from said first mentioned radiation system whereby a receiver located at any point in the area of influence of both of said radiation systems may receive the same program modulation simultaneously from both stations and substantially without interference with the coincidence of modulation contour from both radiation systems.

GORDON BROWN SCHEIBELL.